J. Case.

Corn Planter.

No. 3,388. Reissued Apr. 20, 1869.

N. PETERS, PHOTO-LITHOGRAPHER, WASHINGTON, D. C.

UNITED STATES PATENT OFFICE.

JARVIS CASE, OF LA FAYETTE, INDIANA.

IMPROVEMENT IN CORN-PLANTERS.

Specification forming part of Letters Patent No. 18,730, dated December 1, 1857; Reissue No. 3,388, dated April 20, 1869.

*To all whom it may concern:*

Be it known that I, JARVIS CASE, of La Fayette, county of Tippecanoe, and State of Indiana, have invented certain new and useful Improvements in Corn-Planters; and I hereby declare that the following is a clear, full, and exact description thereof, reference being had to the accompanying drawings, making part of this specification, like letters indicating like parts wherever they occur.

My invention relates to that class of agricultural implements denominated "corn-planters;" and the invention consists in certain novel features and combinations of devices, whereby I am enabled to produce a very perfect machine, as hereinafter explained.

Figure 1:
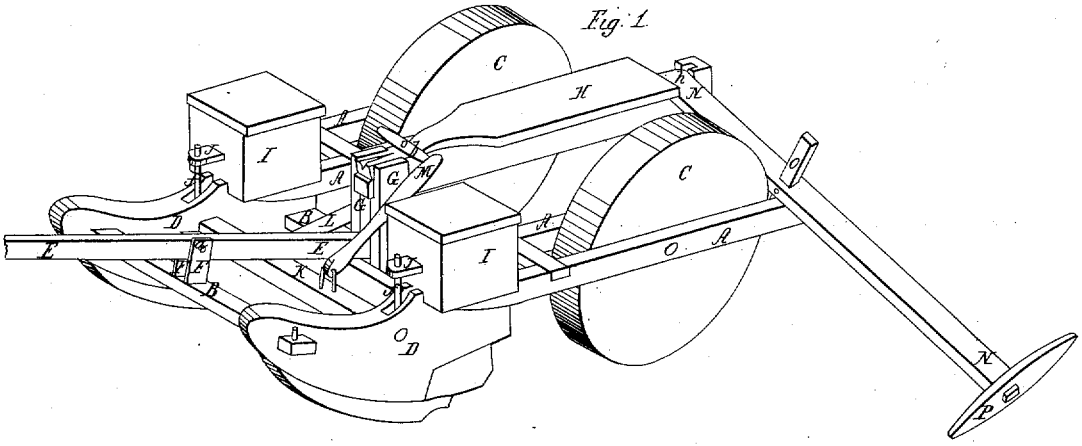
Figure 2:
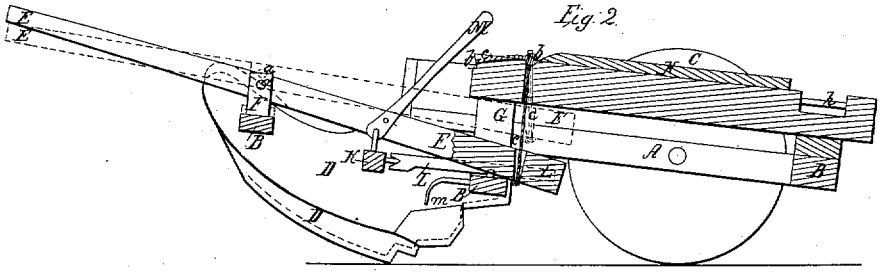
Figure 3:
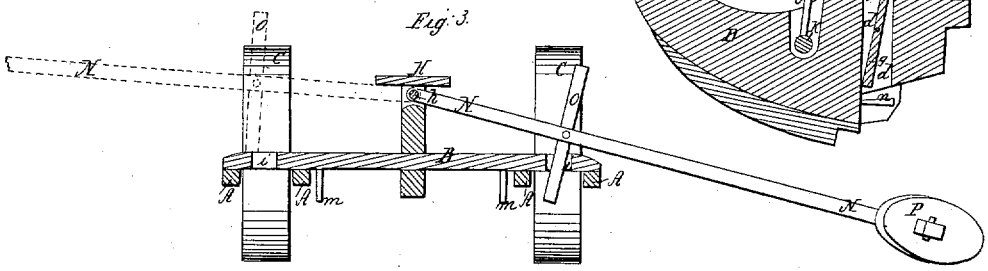

Figure 1 is a perspective view of my improved machine complete. Fig. 2 is a longitudinal vertical section of the same. Fig. 3 is a transverse vertical section near the rear end, and Fig. 4 a longitudinal vertical section through the center of one of the runners.

I construct my machine with a frame consisting of a series of longitudinal bars, A, connected by cross-bars B, the front end resting on a pair of runners, D, and having a pair of wheels, C, located behind the runners. The frame thus made is rigid from end to end, and has located upon its front portion, over the rear portion of the runners D, a couple of seed-hoppers, I, behind which I arrange lengthwise of the machine a seat, H, for the operator, as shown in Figs. 1 and 3, the front end of the seat being supported on two upright pieces, G, as shown in Fig. 1.

The tongue E is pivoted to the front cross-bar B by means of two upright plates or pieces, F, through which and the tongue a bolt, *a*, passes transversely, as represented in Figs. 1 and 2, the rear end of the tongue extending back between the uprights G, which support the front end of the seat, as shown in Fig. 2.

To the rear end of the tongue I attach a cord, *c*, and pass it up through a hole in the seat, and to the upper end of the cord *c*, above the seat H, I secure a short rod or bar, *b*, which rests transversely on the seat, and prevents the cord *c* from dropping down out of the hole. By pulling upon this cord *c* the rear end of the tongue E is raised, and as its front end is held by the neck-yoke of the team in a fixed position, and as the front end of the machine is pivoted to the tongue by the pin *a* the runners D and front portion of the machine will also be raised clear of the ground, as indicated by the red lines in Fig. 2, the tongue thus forming a lever of the second order. In order to hold the machine in this position it is only necessary to shove the bar *b* forward and secure it in a notch in the front of the uprights G, as shown in red in Fig. 2. By releasing it from this notch the rear end of the tongue is lowered, thereby letting the runners down upon the ground again.

Figure 4:
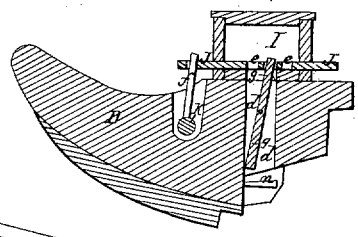

Through each of the hoppers I there extends a seed-slide, J, having two seed-cells, *e*, of proper size to hold the required quantity of grain for a hill. These slides are placed so as to move lengthwise of the machine, and have their front ends protruding from the front side of the hoppers, as shown in Figs. 1 and 4.

A rock-shaft, K, is journaled in the runners, just in front of the hoppers, and has secured to it near each end a rod or arm, *f*, which works in a mortise or slot cut in the runner D, and extends up to and engages in a hole in the front end of the slides J, so that as the rock-shaft K is operated the slides J are moved back and forth.

In order to give motion to the rock-shaft and the slides, I provide two means—one for operating it by the foot and the other by the hand. The first consists of a lever, L, fulcrumed on a cross-bar between the rear ends of the runners, and connecting at its front end by a staple or pin, *o*, with the rock-shaft K, as represented in Fig. 2. By placing his foot on this lever L the operator can move the slides by simply rocking his foot forward or back, a hill or quantity of seed being deposited at each movement.

The hand apparatus consists simply of a handle, M, which is pivoted by a staple to the rock-shaft K, as represented in Figs. 1 and 2. By alternately pulling and pushing this handle the rock-shaft and seed-slides are also operated the same as when the foot-lever or treadle L is operated.

In the rear portion of each runner D, and directly under the hopper, there is formed a vertical channel or seed-duct, *d*, and in this channel I locate a pivoted valve, *g*, its upper end entering a hole or recess in the slide J, so that as the latter is moved to and fro the valve *g* is also moved, its motions being in line with the length of the runner, as shown clearly in Fig. 4, the operation being to drop a hill of seed from the lower valve, *g*, to the ground, and also another charge or hill of seed from the hopper I down to the valve *g* at each movement to or fro.

In order to scatter the seed in the furrow and prevent the stalks from growing in a compact or crowded state, I place first below the mouth of the seed-duct *d* a scatterer, *n*, as represented in Fig. 4. This scatterer may consist of a pin or stick projecting longitudinally across the mouth of the duct *d* or a little below it, so that as the corn falls from the valve *g* it will hit upon this pin or stick *n*, and thus be scattered or spread more or less in hill.

For the purpose of furnishing a means of marking the ground at the same time the planting is done and to keep the rows uniform and equidistant, I provide the machine with a marker, which I locate at the rear end of the machine, so that the operator can reverse it or throw it into or out of operation at pleasure. This marker consists of an oblong rounded piece of plank, P, attached to the end of an arm or rod, N, which has its inner end pivoted at the center of the rear end, as represented at *h*, Fig. 3, it being so arranged that when the part P rests upon the ground the arm N shall clear the frame of the machine, so as to permit the machine to rise or fall without interfering with the operation of or raising the part P from the ground.

In the arm N a short bar or piece, O, is pivoted at a point directly over the frame, in rear of the wheel, as shown in Figs. 1 and 3, there being a hole, *i*, in the frame at that point on each side, as shown in Fig. 3. When it is desired that the marker shall not operate, as in turning at the ends, it is raised up, and the end of the piece O is permitted to rest on the frame, thus holding the marker up off the ground, as shown in red in Fig. 3; but when it is desired to have the marker operate, the lower end of the pivoted piece O is dropped into the hole *i* in the frame, as represented on the right-hand part of Fig. 3, the piece O thus serving the twofold purpose of supporting the marker when raised and also of preventing it from being wrenched loose from its pivot *h*.

The piece P is secured to the arm N in an oblique position, so that while it may be as light as possible it shall make a mark sufficiently large and plain to be readily seen. The distance between the piece P and the seed-duct nearest to it should be exactly equal to the distance that the seed-ducts are apart from each other, so that one of the runners D should always follow in the groove or mark made by the marker.

For the purpose of indicating to the operator the exact time when he should operate the slides, I attach to the cross-bar on which the lever L rests one or more projecting curved pieces, *m*, as shown in Figs. 2 and 3, which serve as indicators. The operator upon the seat H, by looking at these points *m*, can see when the machine is in line with the rows or hills previously planted, and is thus notified that it is time to operate the slides, the indicators *m* being placed a little in advance of the seed-ducts, so as to give a sufficient time for the seed to drop and reach the ground by the time the machine—which, of course, is constantly moving forward—has arrived at the proper position to deliver the seed exactly in line with the hills previously planted. The runners make the furrows for receiving the seed and the wheels C crowd the earth down into furrow after the seed is deposited, and thus cover it, as is usual in this class of machines.

I do not claim broadly the use of a runner for opening a furrow and supporting a seed-hopper, as that has been long known and used, as in the seed-planter of Henry Todd, patented December 15, 1843, and also in the English Patent No. 8,281, to Richard Hornsby, November 25, 1839; but,

Having thus described my invention, what I claim is—

1. The runners D, in combination with the valves *g* and the spreaders *n*, arranged to operate substantially as described.

2. The combination of the hoppers with the slides J, the seed-ducts with their valves *g*, and the spreaders *n*, arranged to operate substantially as set forth.

3. The combination, in a corn-planter, of the seat H, located in rear of the hoppers, the slides J, operated by the handle M, and rock-shaft K and the valves *g*, substantially as herein described.

4. The combination of the runner D, seed-ducts *d*, and spreader *n*, when arranged to operate substantially as described.

5. The combination of the rock-shaft K, with its arms *f* and treadle or foot-lever L, for operating the seed-slides, substantially as described.

6. So combining with the operator's seat H a marker having in its arm a hinged brace or its equivalent as that the operator may from his seat turn over or reverse said marker, suspend it upon the machine while turning around, and drop it into its working position without leaving his seat on the machine, as herein set forth.

7. The combination of the seat H, lever M, slides J, valves *g*, and runners D, when arranged to operate substantially as described.

8. The combination of the seat H, lever M, slides J, valves *g*, spreaders *n*, and runners D, arranged to operate substantially as described.

JARVIS CASE.

Witnesses:
W. C. DODGE,
L. HAILER.